March 19, 1968
M. V. WIENER
3,374,137
ADHESION OF PAPER MATERIALS
Filed Nov. 10, 1964
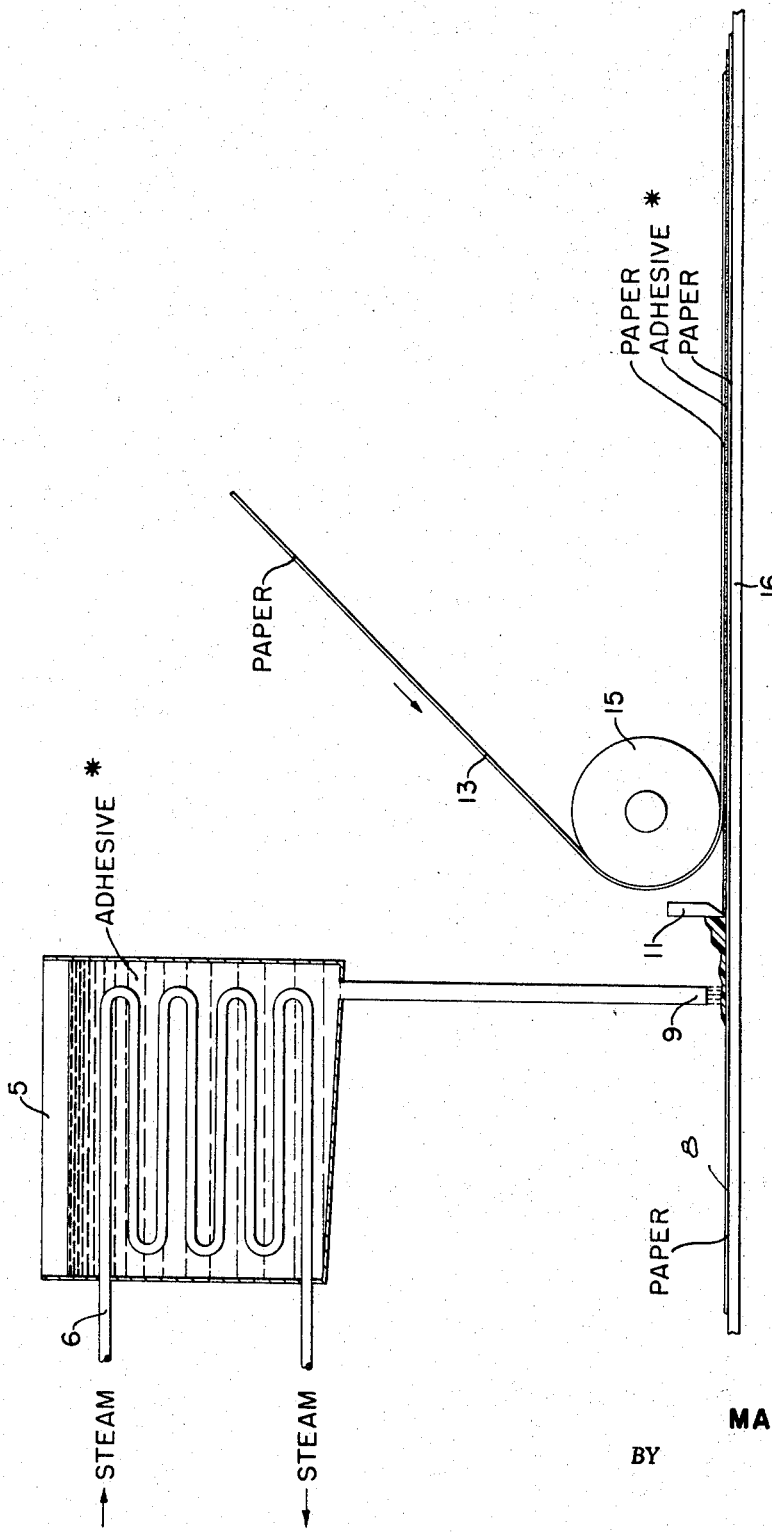
INVENTOR.
MARIA V. WIENER
BY
*J.B. Holden*
ATTORNEY 3,374,137
ADHESION OF PAPER MATERIALS
Maria V. Wiener, Akron, Ohio, assignor to The Goodyear Tire & Rubber Company, Akron, Ohio, a corporation of Ohio
Filed Nov. 10, 1964, Ser. No. 410,198
1 Claim. (Cl. 156—332)

ABSTRACT OF THE DISCLOSURE

Sheets of flexible paper are united by a hot melt of a copolyester of terephthalic acid (80 mol. percent) and sebacic acid (20 mol. percent) and tetramethylene glycol by spreading the adhesive on one sheet of the paper and then quickly pressing the other sheet on to this. The adhesive sets quickly to produce a flexible laminate.

---

This invention relates to adhering together two or more paper substrates by a hot-melt adhesive. The adhesive is a highly flexible, crystalline polyester. It is applied in a molten condition. It is fast setting. The adhesive is particularly adapted for the adhesion of flexible paper structures on high-speed machinery.

Many polyesters are described in the art, and the adhesive properties of various polyesters have been recognized. However, none of these, so far as is known, has been designed particularly to give a very flexible bond between laminated paper articles produced on high-speed machinery where the adhesive must set up almost instantaneously.

The adhesive of this invention is particularly designed for this use. It is a copolyester of sebacic (20 mol percent) and terephthalic (80 mol percent) acids and tetramethylene glycol. It has a high crystallization rate which provides rapid setting of the molten adhesive. When set, the adhesive is highly flexible. It melts at about 185° C. and can be produced in various ranges of intrinsic viscosity in accordance with the required melt viscosity. The preferred intrinsic viscosity range is from 0.6 to 1.0 as measured in a 60/40 mixture of phenol/tetrachloroethane at 30° C. The characteristics of the adhesive permit it to be applied at a temperature easily maintained on high-speed equipment, and at the operating temperature the viscosity is low enough to permit easy and speedy spreading of the melt.

Copolyesters derived from up to 70 weight percent of aromatic acid are known in the art (as in Snyder U.S. 2,623,033 and Williams 2,765,250), but the copolyester of this invention derived from a higher percent of aromatic acid crystallizes more readily and sets faster. A non-crystalline polyester film adhesive, as distinguished from the hot melt of the rapidly crystallizable polyester of this invention, has been described in Banagan U.S. 2,719,100 which also describes the use of adhesive solutions.

It is apparent that other esters of different compositions may be used with varying degrees of success, such as the esters of the more usual aromatic and aliphatic diacids in relative percentages in the neighborhood of that employed in the polyester of this invention (such as mixtures of terephthalic and other aromatic diacids, e.g. phthalic acid and naphthalene dicarboxylic acid, in different percentages, with aliphatic acids such as adipic, suberic, sebacic, azelaic and dodecanedicarboxylic acids, etc., and isomers and homologues thereof) with one or more of the usual glycols (such as ethylene glycol, tri-, tetra-, penta- and hexamethylene glycol, neopentyl glycol, etc.). However, the claimed copolyester has been tailored for use as a hot melt on flexible paper materials, using high-speed machinery.

The polyester of this invention may be made in different ways. Some of the procedures are illustrated in the following examples:

Example 1

The starting reactants were:

|  | Parts by weight | Mol |
|---|---|---|
| Dimethylterephthalate | 31.1 | 0.16 |
| Tetramethylene glycol | 41.4 | 0.46 |
| Lead diacetate trihydrate | 0.125 |  |

The reaction mixture was blanketed with nitrogen. Ester exchange was effected between dimethylterephthalate and the glycol at 245° C. bath temperature. During this time the heat was concentrated in the lower part of the reaction vessel and the methanol was distilled out while the tetramethylene glycol was refluxed to the reaction mixture. When the ester exchange was complete (as indicated by measurement of the amount of methanol collected) 8.1 grams of sebacic acid (0.04 mol) were added to the reaction mixture. Then the whole reaction vessel was heated at 245° C. (bath temperature) and the pressure in the vessel was slowly reduced (within about 20 minutes) to a pressure of about 120 mm. mercury. At this pressure and at 245° C. (bath temperature) the reaction continued for about one hour, while water, some glycol and some side reaction products distilled out. Thereafter the pressure in the reactor was reduced within a few minutes to below one millimeter mercury pressure and the vapor bath was changed to 265° C., at which conditions polycondensation continued for an additional two hours. A high polymer was formed which had a melting point of 185° C. and an intrinsic viscosity of 0.850.

Example 2

The reactants were:

|  | Parts by weight | Mol |
|---|---|---|
| Bis (hydroxybutyl) terephthalate | 24.8 | 0.08 |
| Tetramethylene glycol | 23.4 | 0.26 |
| Polymeric ethylene glycol titanate (27% Ti) | 0.005 |  |
| Terephthalic acid | 13.3 | 0.08 |
| Sebacic acid | 8.1 | 0.04 |

The titanate, used as a catalyst, was dissolved in the mixture of the bis(hydroxybutyl) terephthalate and tetramethylene glycol at 245° C. (bath temperature) while the reactants were blanketed with nitrogen. Then the free acids were added to the mixture, the reactor was heated at 245° C. (bath temperature) and the pressure in the reactor was slowly reduced (within about 20 minutes) to a pressure of about 120 mm. mercury. At this pressure and at 245° C. (bath temperature) the reaction continued for about one hour, while water, some glycol and some side reaction products distilled out. Thereafter the pressure in the reactor was reduced within ten minutes to below one millimeter mercury pressure and the vapor bath was changed to 265° C., at which conditions polycondensation continued for an additional two hours. A high polymer was formed which had a melting point of 185° C. and an intrinsic viscosity of 0.750.

This product can be used generally as an adhesive, as for adhering such materials as leather, fabrics, wood, plastics, etc., but is particularly designed for adhering flexible paper materials.

The invention is further described in connection with the accompanying drawing.

The drawing illustrates the invention quite diagrammatically. The adhesive, which is the mixed ester of the examples, is maintained at a temperature above its melting point in the tank 5 by circulation of steam through the heating coil 6. This ester is delivered on to the paper 8 which is moved at a uniform rapid rate under the delivery spout 9 from the tank 5. The doctor blade 11 spreads the adhesive uniformly in a very thin film. The upper sheet of paper 13 is fed from a suitable source and the two sheets are pressed together between the pressure roller 15 and the support 16, with the adhesive between them.

The sheets need not be the same size, in which case the adhesive will be applied to only a limited area of the lower wider sheet.

The method of adhesive application is illustrated but not limited to the attached drawing. The adhesive melt can thus be applied on other types of machinery, i.e. only spotwise to each of two leaves of a flexible paper container, which are then quickly overlapped with two other leaves of the same container and pressed together while the adhesive sets rapidly and forms a permanent bond.

The invention is covered in the claim which follow.

What I claim is:

1. The method of uniting flexible papers which comprises heating a copolyester of terephthalic (80 mol percent) and sebacic (20 mol percent) acids and glycol consisting entirely of tetramethylene glycol at a temperature sufficiently above its melting point to maintain it as a hot melt to obtain a rapidly crystallizable adhesive, spreading this hot melt on a surface of one flexible paper and then quickly pressing a second flexible paper against the spread adhesive and producing a flexible laminate from the papers and the rapidly crystallizable adhesive.

References Cited

UNITED STATES PATENTS

| | | | |
|---|---|---|---|
| 2,676,128 | 4/1954 | Piccard | 161—232 X |
| 2,726,177 | 12/1955 | Lew | 161—232 X |
| 2,892,747 | 6/1959 | Dye | 161—232 X |
| 2,961,365 | 11/1960 | Sroog | 161—232 X |
| 3,013,914 | 12/1961 | Willard | 161—232 X |

EARL M. BERGERT, *Primary Examiner.*

HAROLD ANSHER, *Assistant Examiner.*